United States Patent [19]

Kluge et al.

[11] Patent Number: 4,770,893

[45] Date of Patent: Sep. 13, 1988

[54] METHOD FOR PREPARING A REHYDRATABLE POTATO PRODUCT

[75] Inventors: Günter Kluge, Grasbrunn; Karl Petutschnig, Munich; Thomas Pepperl, Geretsried, all of Fed. Rep. of Germany

[73] Assignee: Pfanni Werke Otto Eckart KG, Munich, Fed. Rep. of Germany

[21] Appl. No.: 87,014

[22] Filed: Aug. 18, 1987

Related U.S. Application Data

[63] Continuation-in-part of Ser. No. 860,060, May 6, 1986, abandoned, which is a continuation-in-part of Ser. No. 669,439, Nov. 7, 1984, abandoned.

[30] Foreign Application Priority Data

Nov. 11, 1983 [DE] Fed. Rep. of Germany ....... 3340955

[51] Int. Cl.$^4$ ............................................. A23L 1/2165
[52] U.S. Cl. .................................... 426/637; 426/388; 426/457; 426/464
[58] Field of Search ............... 426/637, 456, 457, 464, 426/473, 388

[56] References Cited

U.S. PATENT DOCUMENTS

| | | | |
|---|---|---|---|
| 3,009,817 | 11/1961 | Hendel et al. | 426/465 X |
| 3,085,019 | 4/1963 | Kueneman | 426/637 |
| 3,136,643 | 6/1964 | Reeves et al. | 426/456 X |
| 3,457,088 | 7/1969 | Beck | 426/456 X |
| 3,458,325 | 7/1969 | Beck | 426/456 X |
| 3,535,128 | 10/1970 | Willard | 426/456 |
| 3,764,716 | 10/1973 | Rainwater et al. | 426/457 X |
| 4,110,478 | 8/1978 | Ooraiku | 426/637 X |

FOREIGN PATENT DOCUMENTS

| | | | |
|---|---|---|---|
| 86185 | 8/1983 | European Pat. Off. | 426/637 |
| 498941 | 4/1976 | U.S.S.R. | 426/637 |
| 561549 | 8/1977 | U.S.S.R. | 426/637 |
| 563957 | 9/1977 | U.S.S.R. | 426/637 |
| 610510 | 6/1978 | U.S.S.R. | 426/637 |
| 736942 | 5/1980 | U.S.S.R. | 426/637 |
| 799710 | 2/1981 | U.S.S.R. | 426/637 |
| 833191 | 5/1981 | U.S.S.R. | 426/637 |
| 925888 | 5/1963 | United Kingdom | 426/473 |

*Primary Examiner*—Arthur L. Corbin
*Attorney, Agent, or Firm*—Hedman, Gibson, Costigan & Hoare

[57] ABSTRACT

For cream potatoes looking and tasting practically the same as home-made, a creamable dried potato product comprises a major proportion of dried potato flakes or granules processed in the usual manner as basic component and a minor proportion of potato granules as additive component, wherein both components are mixed dry and the additive component is prepared from potato pieces which are partly cooked, then dried and reduced to a particle size of between 0.25 mm and 2.5 mm, wherein the cooking rate of these potato pieces corresponds to the area defined by the definite integral 0 to $TdT = 100°$ C. min. to 600° C. min, when plotting the temperature in °C., measured at the thermal centers of the potato pieces against the heating time in minutes.

6 Claims, 1 Drawing Sheet

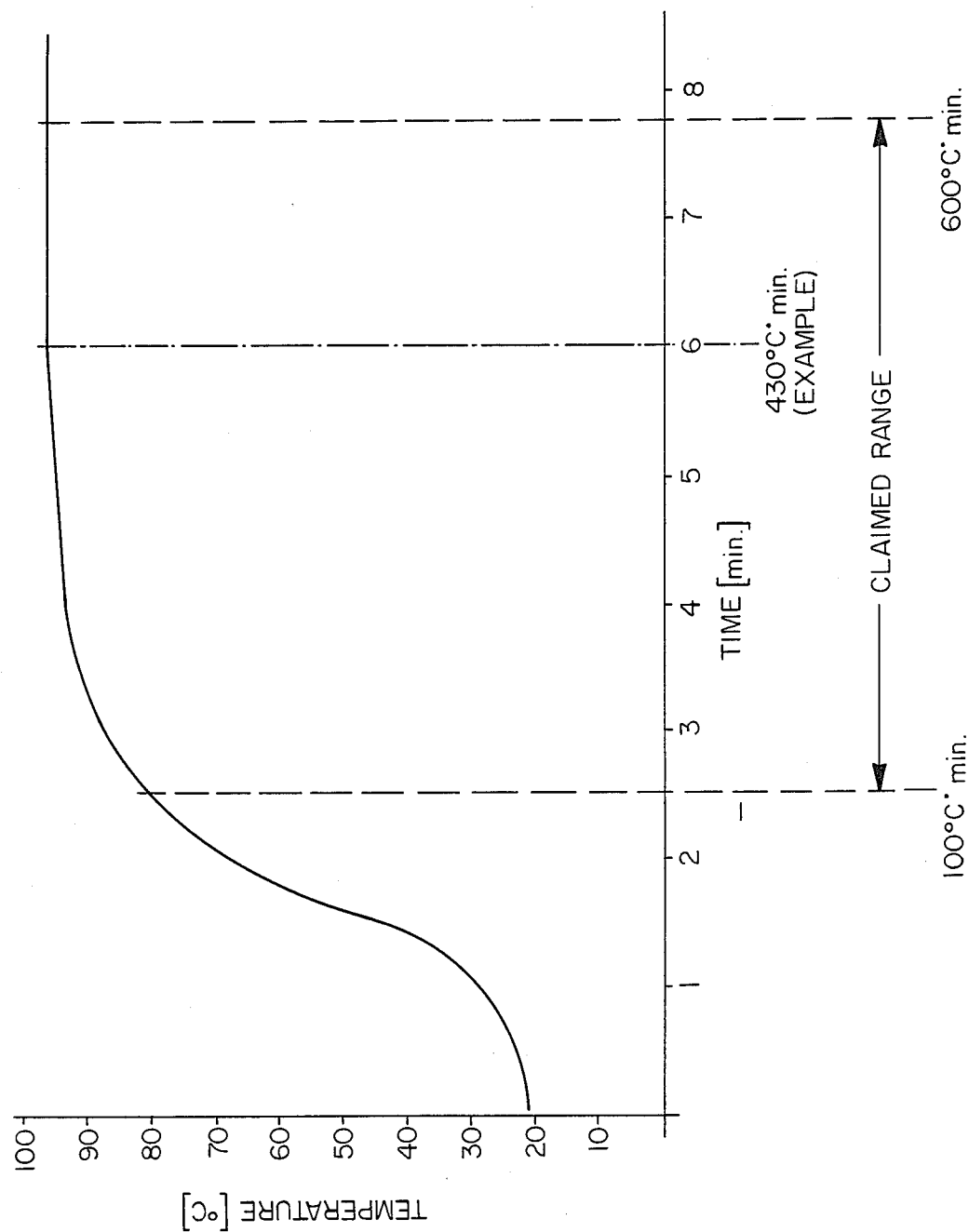

METHOD FOR PREPARING A REHYDRATABLE POTATO PRODUCT

This application is a continuation-in-part of application Ser. No. 860,060 filed May 6, 1986, now abandoned which is a continuation-in-part of application Ser. No. 669,439 filed Nov. 7, 1984, now abandoned.

BACKGROUND OF THE INVENTION

The present invention relates to a method for the manufacture of cream potatoes or potato puree which in taste, appearance and consistency match home-made cream potatoes or potato puree.

To prepare home-made cream potatoes, washed potatoes are peeled, quartered and boiled in salt water until they are tender and fully cooked. The hot potatoes are then mashed (pureed) by means of a potato masher, press, crusher or ricer, thereby producing a pulp.

This pulp, which still contains large potato pieces, is now stirred or beaten well after adding milk, butter, salt and spices. The resulting product is frothy, spongy creamed potatoes, or potato paste, which still contains a distinctly perceptible proportion of uncrushed potato lumps.

It is now the object of the present invention to provide a dried cream potato or potato puree product which, after preparation, is almost the same in its sensorial properties as home-made cream potatoes or potato puree.

Two basic methods have been adopted for the manufacture of dried cream potato products:

Potato Flake Method

Peeled potatoes are cut into slices, pre-cooked, cooled and fully-cooked. They are then subjected to a crushing step and dried as flakes in a rotating dryer. This has come to be known as the potato flake method.

Granule Method

According to another method referred to as the granule method the potatoes are cooked and pulped, a corresponding part of almost dried potato granules is added and mixed in accordance with the add-back process; the resulting granulate is dried on a conveyor belt.

Commercial processed ready-to-use cream potato products are generally made from potato granules. The consumer only has to stir these into hot water or milk. It is not possible to obtain a satisfactory granulate by milling dried potatoes because the cell walls are ruptured by the milling process and starch is released. If water is then added, a gluey, hardly edible product results. A large number of British and U.S. patents deal with the production of potato granules. It is essential that as small an amount of starch cells as possible, not more than 10 to 15%, are ruptured. The critical moisture content in comminuting is 40 to 60% to avoid the destruction of cells. Technically, this may be done by admixing dried material (add-back process) or freezing the cooked potatoes, thawing them and then centrifuging or pressing them.

The add-back process which also favours the desired retrogradation of starch was important for enhancing the properties of dried potato products. A dry pre-product or initial product is mixed with moist starting product in such an amount that the average moisture content is between 30 and 40%. For homogeneous distribution of moisture the mixture is left standing for a while, a step that is known as conditioning, and then is granulated. The granulate is initially dried and then finally dried in a fluidized bed. Granulate which is too coarse is milled again and again mixed with moist starting product together with granulate which is too fine.

A typical recipe has been recited by J. W. Greene et al (Chemical Engineering Progress 44, 547, 1948) and in many patents. The potatoes are cut into slices, cooked for 30 minutes at about 100° C. with steam and then frozen at minus 4° C., slowly thawed under circulation of hot air and excessive moisture is removed by centrifuging or pressing, in which case the pressure may not exceed 3.5 kg/cm$^2$. Then the material is granulated by passing it through a sieve and is then initially dried in a stream of hot air and finally dried on a drum drier.

Thus, these potato granules and potato flakes consist entirely of fully cooked potatoes which when stirred with hot water or hot milk result in a fully homogeneous puree without any discreet potato pieces.

The consistency of industrially processed dried cream potato products shows distinct quality disadvantages compared with fresh home-made cream potatoes. For this reason there has been no lack of attempts to improve the consistency of industrial dried potato puree. German patent Al No. 28 55 704 entitled "Method for improving the consistency of reconstituted instant cream potatoes" describes a method according to which the puree consistency is to be improved by incorporating raw vegetable fibers in a dried cream potato product in an amount of up to 10% by weight. The object of this method is to manufacture a cream potato product of thicker consistency, i.e. to prevent it from showing a watery consistency when prepared.

A two-step method is further known from U.S. Pat. No. 3,335,304 referring to the manufacture of cream potatoes. According to this method whole potatoes are pre-cooked until they are done on the outside, then cut into slices and cooked at a higher temperature; the cooked slices are partly mashed or partly pureed, the remaining lumps which are not yet completely cooked being reduced by application of pressure on a rotating drier and fully cooked at the same time.

Furthermore, a method for the manufacture of a dried cream potato product is known from U.S. Pat. No. 3,054,683 that has the object of providing a mashed potato product which after preparation gives no sandy, wooly feeling in the mouth but the feeling of a smooth, pleasant consistency instead. This is achieved when, by way of example, alginate, guarana-flour, gum arabic, tragacanth or similar polysaccharides are added.

From U.S. Pat. No. 3,458,325 it is known to mix approximately 3 parts of potato flakes with about 1 part of potato granules in the dry state, which, however, both consist of fully cooked potatoes, to moisten the dry mixture to a moisture content of about 25%, to agglomerate to a coarse, granular product by mixing and to dry the mixture. Using this product for potato mash produces a completely smooth mash, without providing the sensorial property sought here of having a certain proportion of particles, as is typical of home-made potato mash.

OBJECT OF THE INVENTION

It is the object of the present invention to provide a dried cream potato product which after rehydration is very similar in its sensoric properties when eaten to home-made cream potatoes. When eating the inventive cream potatoes the consumer should, more particularly, feel that there are still small potato pieces contained in the mash which do not homogenize with the mash when the latter is stirred with hot milk or water, as is also the case the home-made mashed potatoes.

SUMMARY OF THE INVENTION

According to the invention a method for industrially manufactured dried potato mash is provided such that the mashed potatoes, when rehydrated, have the same characteristics as fresh home-made mashed or cream potatoes, the method comprising the steps of (a) using cream potato flakes or granules manufactured in the manner known per se as the basic component of the potato mash according to the invention, and (b) adding a second potato component which is manufactured as follows: peeled potatoes are cut into pieces of roughly the same size and weight; the potato pieces are heated at a temperature of between 70° C. and 100° C. (i.e. blanched) in water or steam until when plotting the temperature in °C., measured at the thermal centers of the potato pieces against the heating time in minutes the area determined by the definite integral $$\int_0^T TDT$$

lies within the limits 100° C. min and 600° C. min.

The potato pieces thus heat-treated are then carefully dried, preferably until they have a final water content of about 8%. The dried potato pieces thus obtained are subsequently reduced to a particle size of between 0.25 and 2.5 mm, sifted and included as the second potato component in an amount of between 3 and 30% with respect to the total amount.

Preferably, the potato pieces to be used have uniform cross-sections e.g. strips of 5×7 mm or slices of 10×10×2.5 mm, in order to obtain a uniform cooking rate over the whole cross-section. The partly cooked potato pieces are then preferably dried in a convection dryer (e.g. dryer-conveyor) first at a temperature of 120° C., falling to 70° C. at the end of drying, until dried to a final water content of about 8%. The drying period lasts about 4.5 hours depending on the size of the potato pieces. The comminution of the potato pieces is preferably performed in a hammer-mill with a 3 mm sieve spacing at a suitable rotation speed, in particular at 1500 rpm. A fraction from between 0.5 mm and 1.0 mm is preferably sieved from the grist obtained and is used as the second component of the dried potato mash according to the invention (a preferred particle distribution is given at the end of the Example). However, granules of coarser or finer particle distribution are also suitable for the manufacture of puree according to the invention, such as by way of example, those mentioned between 0.25 and 2.5 mm. The blanched potato granulate according to the invention is added to potatoe flake or granulate in an amount of 3 to 30%, preferably 10 to 15% by weight with respect to the total amount (thus the mixture of a basic mash with the second component).

Obviously, the mash flakes or granulate can contain milk ingredients or spice components which are known in the art of cream potatoes. The blanched granulate, which is preferably contained in an amount of 10 to 15% of the total mixture, results after reconstitution of the puree to a consistency similar to that of freshly prepared creamed or mashed potatoes, i.e. there are still lumpy parts clearly noticeable in the mash. This is the surprising effect which is attainable, depending on the kind of potato, just by maintaining a cooking rate corresponding to an integral value between 100° C. min. and 600° C. min. The preferred range lies between 300° C. min. and 500° C. min.

DETAILED DESCRIPTION OF THE PREFERRED EMBODIMENT OF THE INVENTION

The invention will now be explained more clearly by means of examples.

EXAMPLE 1

The manufacture of the blanched granulate component in accordance with the invention is performed in the following manner:

Potatoes of the Bintje variety were peeled in a steam-peeler and subsequently cut into slices of 5×7 mm. The slices were cooked in a flow of steam for 6 min. at 100° C. (see center-temperature measurement) which gives an integral value of 430° C. min. The treated slices were dried on a beltdryer until 8% water content remained. The dried slices were milled in a hammer-mill fitted with a 3 mm sieve, and the 0.5 mm to 1 mm fraction sifted from the mill grist. The potatoe granulate obtained was mixed with dried potato flakes in an amount of 12% of the total mixture (the composition thus being 12% and 88%).

The preparation of the cream potatoes is done by boiling ¼ l. water and ¼ l. milk together, briefly stirring in 90 g of the dry mash according to the invention and stirring rigourously once again after about one minute. The result is a cream potato of excellent taste having a typical consistency as if made of freshly mashed potatoes.

The potato pieces used as second potato component were sifted through a sieve spaced at 0.5 to 1.0 mm and this 0.5 to 1.0 mm fraction had the following proportions of particle distribution:

| 1.0 | 0.75 | 0.6 | 0.5 | 0.5 |
|---|---|---|---|---|
| 0.25% | 44.55% | 18.35% | 27.75% | 6.1% |

The accompanying figure shows plot of the graph for the nucleus temperature of potato strips of 5×7 mm in a flow of steam at 100° C. with the claimed integral shown dotted and the integral used in the Example dot-lined (.-.-.-).

EXAMPLE 2

Comparative results are shown in the following example.

The product of the above example was compared on the one hand with freshly made mashed potato which should give the best results and on the other hand with three mash granulates recited by the prior art, that is U.S. Pat. Nos. 3,458,325, Test no. 10; 3,009,817, Example 1 and the Example of Russian Pat. No. 561,549, that is mashed potato granulate made according to the add-back process.

The granulate according to U.S. Pat. No. 3,458,325 was made by mixing three parts by weight of commercial potato flakes—8 mash and 1 part by weight of commercial potato granules, rewetting to a moisture content of about 25%, one hour conditioning and then second mixing and granulating and then drying. The granulate according to U.S. Pat. No. 3,009,817 was made by washing and peeling the potatoes, cutting into slices of ¾ inch thickness, cooking 60 minutes at 190° F., mashing and adding 10% of the weight of water containing 0.6 g of sodium bisulphite per ten pounds of potatoes, drum drying at 250° F. to a moisture content of 56.5% and then feeding the mash into a trough granulator and then conditioning for 60 minutes at 2 r.p.m. and then one further hour granulating the mash also at 2 r.p.m. The granulated mash was then treated with a current of air of 200° F. in the granulator for 30 minutes at 5 r.p.m. After one hour, practically all the material had passed the 80 mesh sieve of the trough and was then finally dried in a fluidized bed drier to 6% moisture content.

The granulate according to USSR Pat. No. 561,549, which is an add-back process, was made by washing, peeling and cutting the potatoes into slices of 14 mm thickness, blanching in water for 15 minutes at 80° C., cooling with running water for 30 minutes and then boiling in steam of 98° C. for 35 minutes. Sixty-five percent of that material was roller mashed and dried to 15% moisture content and then ground to flakes of at least 6 mm size. This semifinished product was then passed to a mixer. The other 35% were mashed through a 5 mm mesh sieve, cooled to about 16° C. and this natural puree was also passed to the same mixer which already contained the semifinished product and dry granulate. The amount of the three components, based on dry matter, was 1.2:3.6:1.0. This mixture was conditioned for 30 minutes at room temperature (18°-19° C.) and then screened on a vibrating screen having sieve openings of 2.2 mm and then dried in a fluidized bed dryer for 15 minutes at 90° C. which resulted in a product of about 7% moisture content.

To have comparable relations between the three above mentioned mashes, that is according to U.S. Pat. Nos. 3,458,325 (mash 1), 3,099,817 (mash 2) and Russian Pat. No. 561,549 (mash 3) and the mash according to the present invention the mashes were only used after 3 months storage at room temperature in an air-tight package, as is usual for commercial potato mashes.

Preparation of Cream Potato

Freshly made mash: Bintje potatoes were peeled and cut into four quarters and then boiled in water containing some salt. After boiling the potatoes while still hot, they were mashed by pressing through a potato masher and stirred foamy with milk and salt using a whisk (whip, egg beater), that is according to the usual housewife's recipe.

Granulate mashes: These were prepared according to the recipes given on commercial packages. Boiling water was placed in a bowl and the dry granulate was stirred into the water with a whisk at a ratio of 1:5 (as indicated on the printed recipes).

Potato mash according to the invention: The puree used was that produced according to the above Example 1 dried to a final water content of 8%. The mash consisted of 12% by weight of the granulate of not fully cooked potatoes and 88% by weight of a commercial dried potato flake mash packed in air-tight packages and stored at room temperature for three months. For reconstitution, boiling water is placed in a bowl and the dried mash product according to the invention is stirred into the water at a ratio of 1:6 with a whisk (egg beater). (About 20% more has to be used to obtain the same consistency as that of the three granulate mashes.)

The consistency (i.e. body or viscosity) of all five potato purees was the same.

Test Procedure

The freshly made potato mash was compared with the three granulate mashes and the mash according to the invention. The freshly made mash was given to 8 test persons as the standard with which the other four mashes had to be compared. The other four mashes were tested blindfold. This means that the freshly made mash was given as such to the test persons while the other four purees were given to the testers without any clue with respect to the contents of the plate.

Test Results

The following table shows the test results as average data for 8 test persons. A rating of 1 to 8 is used, 1 being very bad and 8 being very good.

(1) Freshly made mash:

| Odor | Taste | Consistency |
|---|---|---|
| typical potato aroma; no off-odor | typical pure potato taste; no-off taste | fluffy creamy, not sandy, clearly noticeable small potato pieces in puree |
| | Rating | |
| 8 | 8 | 8 |

(2) Test mashes:

| Product | Odor | Taste | Consistency | |
|---|---|---|---|---|
| (2) Granulate Mash 1 | 5.2 | 5.5 | 5.4 | odor and taste like old potatoes; consistency sandy |
| (3) Granulate Mash 2 | 5.5 | 6.1 | 5.2 | as above |
| (4) Granulate Mash 3 | 5.0 | 5.6 | 5.1 | as above |
| (5) Mash according to invention | 7.2 | 7.6 | 7.4 | odor and taste like pure potatoes; consistency fluffy, creamy; small potato pieces clearly noticeable |

Testing rating 1-8
1 = very bad
8 = very good

Thus, in blindfolded testing of the test mashes 2-5 in comparison to freshly made mash 1 the test panel clearly preferred test mash No. 5, the mash according to the invention, with respect to odor, taste and consistency.

Due to the contents of not fully-cooked potatoes the mash according to the invention takes up about 20% more water, based on the added amount of water, than commercial granulate mashes to reach the same consistency. This means that the same weight of the reconstituted mash according to the invention has less calories than commercial mash, as about 20% less potato product is contained in the finished mash while using the same amount of water.

We claim:

1. A method for producing a rehydratable dried potato product which, when rehydrated, is sensorially practically the same as home-made potato puree, said method comprising the steps of:

producing dried potato puree flakes or granules; cutting uncooked potato pieces into substantially uniform size pieces;

heating the potato pieces in water at a temperature of between 70° C. and 100° C. until the integral of the temperature measured at the thermal center of the pieces plotted against the heating time equals an area between 300° min. to 500° min. to yield part-cooked potato pieces;

drying the part-cooked potato pieces to a water content of about 8%;

reducing the part-cooked and dried potato pieces to yield pieces having sizes between 0.25 mm to 2.5 mm; and mixing the dried and reduced part-cooked potato pieces with the dried potato puree flakes or granules such that the part-cooked pieces comprise between approximately 3 and 30 weight percent of the total amount to yield the rehydratable dried potato product.

2. A process as in claim 1 wherein the water is in the form of steam.

3. A process as in claim 2 wherein the part-cooked and dried potato pieces are reduced to sizes of between 0.5 mm and 1.0 mm.

4. A process as in claim 3 wherein the step of reducing the potato pieces comprises the step of sifting the potato pieces.

5. A process as in claim 4 wherein the potato pieces comprise between approximately 10 and 15 weight percent of the rehydratable dried potato product.

6. A method as in claim 1 wherein the potato pieces are heated in steam at approximately 100° C. for approximately six minutes, such that the temperature measured at the thermal center of the potato pieces plotted against the heating time equals approximately 430° C. min.

* * * * *